Jan. 26, 1965 N. L. MEYEROWITZ 3,167,292
BRACKET
Filed Dec. 12, 1963
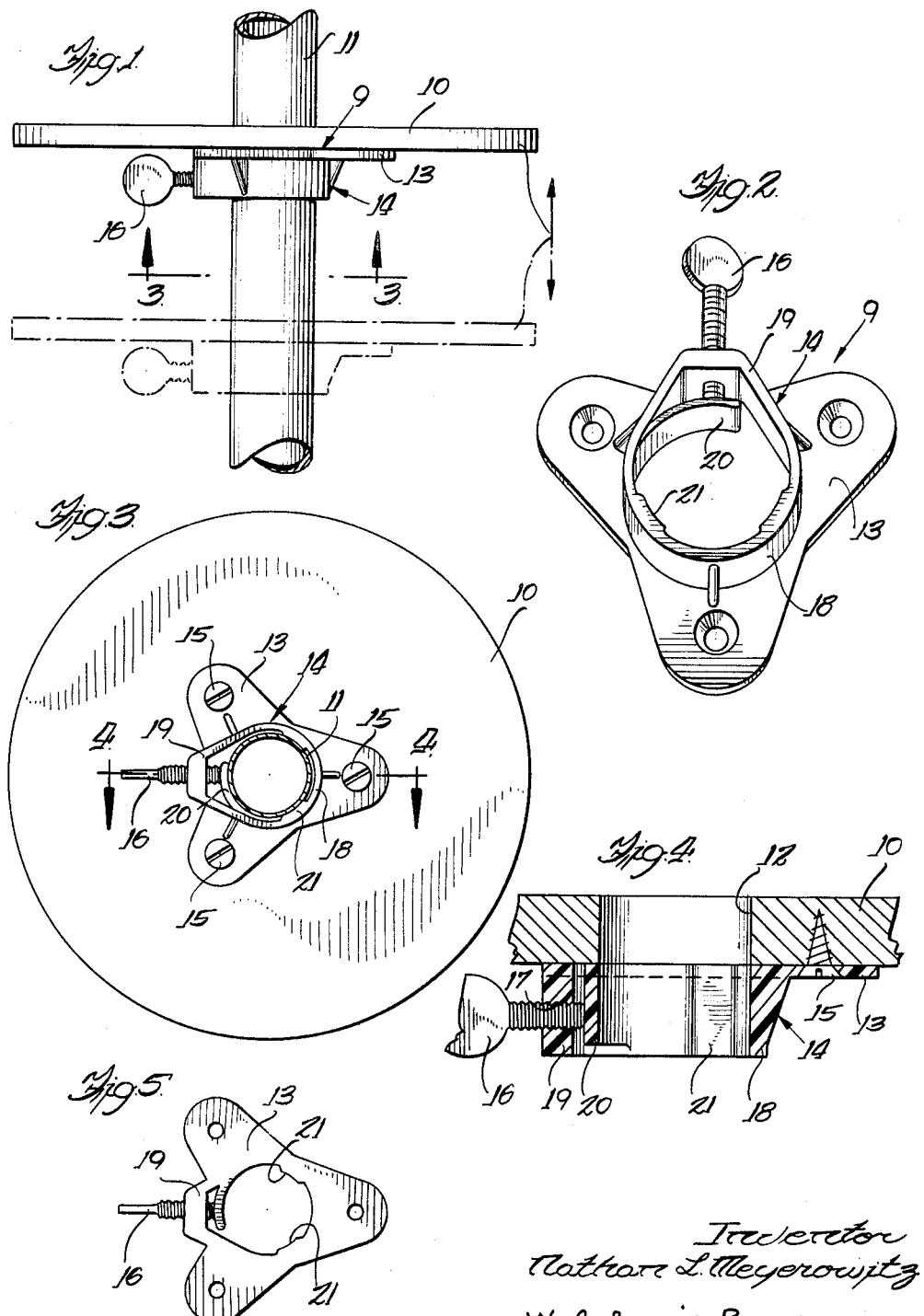
Inventor
Nathan L. Meyerowitz
Welsh and Bradway
Attorneys

United States Patent Office 3,167,292
Patented Jan. 26, 1965

3,167,292
BRACKET
Nathan L. Meyerowitz, 5000 N. Drake Ave., Chicago, Ill.
Filed Dec. 12, 1963, Ser. No. 330,188
4 Claims. (Cl. 248—230)

This invention relates generally to a bracket for supporting a part such as a flat shelf or table top on a pole extending through an aperture in the part. More particularly, the invention relates to a bracket of the type having a tubular portion receiving the pole and formed with a radial hole which is threaded to receive a screw for applying a clamping force to hold the bracket releasably secured to the pole.

The primary object of the invention is to construct a bracket of the above character in a novel manner as a one piece plastic molding which grips a pole positively to hold the part in a selected position without scratching or otherwise marring the pole surface.

Another object is to avoid marring the pole by applying the clamping force of the screw to the pole through a non-metallic plastic part of the bracket.

Still another object is to increase the effective clamping force of the screw by a novel arrangement of ribs which concentrate the force at angularly spaced points around the pole.

Other objects and advantages of the invention will become apparent from the following detailed description taken in connection with the accompanying drawings in which—

FIGURE 1 is a side elevational view of a bracket embodying the novel features of the present invention, the bracket being shown attached to a table and mounted on a vertical pole.

FIG. 2 is a perspective view of the bottom of the bracket.

FIG. 3 is a bottom plan view of the bracket and pole taken along the line 3—3 of FIG. 1.

FIG. 4 is a fragmentary sectional view taken along the line 4—4 of FIG. 3 with the pole removed.

FIG. 5 is a top plan view of the bracket.

In the drawings, the invention is shown for purposes of illustration embodied in a bracket which is especially adapted for securing a shelf or flat table top 10 releasably in a selected position along a cylindrical pole 11 extending through a cylindrical aperture 12 in the table. Generally, the bracket comprises a plate portion 13 which on one side, is flat and therefore complementary in shape to the underside of the table and lies against that portion of the table surrounding the aperture. Projecting laterally from the other side of the plate portion is a tubular portion 14 which is adapted to encircle and be clamped against the pole. The plate portion is attached to the table as by screws 15 and the clamping force is derived from a thumb screw 16 which is threaded into a radial aperture 17 in the tubular portion.

The present invention contemplates a novel construction of the bracket 9 enabling it to be formed easily and at low cost as a one-piece plastic molding and also to be clamped against the pole 11 effectively without marring or scratching the pole. To these ends, the tubular portion 14, in addition to a cylindrical section 18, includes a radially enlarged section 19 and a flap 20 extending circumferentially across the enlarged section and forming an extension of the wall of the cylindrical section. One end of the flap is secured to the cylindrical section and the other end portion extends in cantilever fashion in radial alinement with the thumb screw aperture 17 which is formed in the enlarged section 19. Although the free end portion of the flap normally forms an extension of the cylindrical section permitting insertion of the pole, it is shiftable radially and inwardly against the pole and into clamping engagement therewith by the screw when the screw is turned inwardly against the outer side of the flap. To facilitate molding of the flap as an integral part of the tubular portion, the flap is of slightly shorter axial extent than the tubular portion 14.

To insure effective clamping engagement between the bracket 9 and the pole 11, the force resulting from turning the thumb screw 16 inwardly is concentrated at angularly spaced points around the pole and along lines paralleling the axis of the tubular portion 14. This is accomplished by the provision of parallel ribs 21 projecting inwardly from the cylindrical section 18 opposite the flap 20 and extending longitudinally of the pole. Herein, there are two such ribs presenting concave cylindrical surfaces to the pole and spaced angularly substantially equal distances from each other and the screw. These ribs serve not only to hold the bracket and the table top 10 against shifting along the pole, but also, to maintain the bracket and pole axes in coincidence or parallelism so that the table top is in a plane normal to the pole. The spacing of the ribs and the flap in the relaxed condition of the flap without screw pressure is just great enough to permit the bracket to slide freely along the pole.

It will be apparent that all parts of the bracket 9 may be formed integrally in a single molding operation, the walls of the tubular portion 14 and the flap 20 having a slight taper (not shown) due to the draw of the mold. The material of the bracket is a suitable resin providing sufficient stiffness for retaining the table top 10 rigidly in its plane normal to the pole 11 with some flexibility in the flap to achieve the desired clamping. After the pole is inserted between the flap and the ribs 21 with the thumb screw 16 retracted, the screw is turned inwardly to shift the flap inwardly against the pole. The force exerted by the screw is distributed among the flap and the ribs to draw the latter against the side of the pole opposite the flap. Being concentrated by the ribs, the force effectively clamps the bracket to the pole and maintains the table top normal to the pole.

If it is desired to shift the table along the pole, the screw is simply turned reversely to relieve the pressure and release the bracket for sliding along the pole. During the shifting, the ribs and flap tend to maintain the table in its normal position with respect to the pole.

While the invention is susceptible of various modifications and alternative constructions, there is shown in the drawings and described above, a preferred embodiment of the invention. It is to be understood, however, that the invention is not intended to be limited by such disclosure. Rather, the aim is to cover all modifications and alternative constructions falling within the spirit and scope of the invention as expressed in the appended claims.

I claim:
1. A bracket for supporting a part adjustably on a cylindrical pole extending through the part, said bracket comprising a one-piece plastic molded part having a plate portion complementary in shape to and adapted to lie against a portion of said part encircling said pole and facing axially of the pole, a hollow tubular member projecting laterally from one side of said plate portion to encircle said pole and having a radial projection with an aperture extending radially of the member and threaded to receive a screw, a curved flap extending circumferentially in cantilever fashion from the interior of said tubular member adjacent said radial projection and having a free end portion extending across said aperture for engagement by the inner end of a screw in the aperture and movable radially and into clamping engagement with a pole extending through the tubular member, and two ribs extending axially of said tubular portion and project- ing radially and inwardly from the inner side of the portion at points spaced angularly from said flap portion so as to engage a pole in the tubular portion and concentrate on the pole the clamping force exerted by the flap portion on the pole due to turning a screw against the outer side of the flap.

2. A bracket for supporting a flat table on a cylindrical pole extending through a hole formed in and normal to the table, said bracket having a hollow tubular portion adapted to receive said pole and divided into a cylindrical section and a radially enlarged section, a circumferentially extending curved flap overlapping said enlarged portion radially and forming a cantilever extension of said cylindrical portion, said flap having a free end portion movable radially, means on said radially enlarged portion defining a radially disposed threaded aperture alined with said free end portion of said flap and adapted to receive a screw for abutting the outer side of the flap and applying an inward force to the flap to move the flap into clamping engagement with a pole extending through said tubular portion, axially extending ribs projecting radially and inwardly from the inner side of said cylindrical section at points angularly spaced from each other and said flap to engage a pole within the tubular portion to concentrate said clamping force and grip the pole frictionally, and a plurality of flat arms projecting radially and outwardly from said tubular portion at angularly spaced points and in a common plane with one end of the tubular portion and having apertures to receive screws for securing the bracket flat against one side of a table.

3. A bracket for supporting a flat table on a cylindrical pole extending through a hole formed in and normal to the table, said bracket having a hollow tubular portion adapted to receive said pole and divided into a cylindrical section and a radially enlarged section, a circumferentially extending curved flap overlapping said enlarged portion radially and forming a cantilever extension of said cylindrical portion, said flap having a free end portion movable radially, means on said radially enlarged portion defining a radially disposed threaded aperture alined with said free end portion of said flap and adapted to receive a screw for abutting the outer side of the flap and applying an inward force to the flap to move the flap into clamping engagement with a pole extending through said tubular portion, and axially extending ribs projecting radially and inwardly from the inner side of said cylindrical section at points angularly spaced from each other and said flap to engage a pole within the tubular portion to concentrate said clamping force and grip the pole frictionally.

4. A bracket for supporting a part adjustably on a cylindrical pole extending through the part, said bracket comprising a one-piece plastic molded part having a plate portion complementary in shape to and adapted to lie against a portion of said part encircling said pole and facing axially of the pole, a hollow tubular member projecting laterally from one side of said plate portion to encircle said pole and having a radial projection with an aperture extending radially of the member and threaded to receive a screw, and a curved flap portion extending circumferentially in cantilever fashion from the interior of said tubular member adjacent said radial projection and having a free end portion extending across said aperture for engagement by the inner end of a screw in the aperture and movable radially and into clamping engagement with a pole extending through the tubular portion when a screw is turned against the outer side of the flap.

References Cited in the file of this patent

UNITED STATES PATENTS

| | | |
|---|---|---|
| 2,309,333 | Bahr | Jan. 26, 1943 |
| 2,545,784 | Kenner | Mar. 20, 1951 |
| 2,679,993 | Christophersen | June 1, 1954 |
| 2,712,917 | Flora et al. | July 12, 1955 |
| 2,967,039 | Garman | Jan. 3, 1961 |
| 3,003,646 | Wolf | Oct. 10, 1961 |